June 29, 1965 J. F. MEACHAM 3,192,446
DISTRIBUTION PANEL
Filed May 16, 1960 5 Sheets-Sheet 4

INVENTOR.
James F. Meacham
BY
OSTROLENK, FABER, GERB & SOFFEN.
ATTORNEYS

June 29, 1965  J. F. MEACHAM  3,192,446
DISTRIBUTION PANEL

Filed May 16, 1960  5 Sheets-Sheet 5

INVENTOR.
James F. Meacham
BY
OSTROLENK, FABER, GERB & SOFFEN.
ATTORNEYS

United States Patent Office 3,192,446
Patented June 29, 1965

3,192,446
DISTRIBUTION PANEL
James F. Meacham, Atlanta, Ga., assignor to I-T-E Circuit Breaker Company, Philadelphia, Pa., a corporation of Pennsylvania
Filed May 16, 1960, Ser. No. 29,256
6 Claims. (Cl. 317—119)

This invention relates to a distribution panel in which a plurality of circuits may be derived from a central point, and more specifically relates to a distribution panel in which a single chassis can receive different width circuit breakers.

In the past, when a distribution panel was required to energize circuits of different current ratings or some single phase circuits and some multiphase circuits so that different size circuit breakers were required, it was necessary to provide a respective chassis for each of the different size circuit breakers. Thus, when small single phase circuit breakers having terminals on one inch centers were necessarily provided in the same box with a larger multi-phase circuit breaker or higher current capacity circuit breakers having terminals at larger centers, such as 1½ inch centers, a separate chassis was required for these larger circuit breakers. Because of this, the overall size of the complete distribution panel was substantially increased, and a relatively large number of different parts had to be available, thus increasing the number of pieces and size of an inventory, and increasing the price of manufacture of the overall unit.

In the present invention, a single chassis is used which can receive different size circuit breakers having their terminals spaced on different dimensions centers whereby the dimensional differences are taken into account by simple strap conductors extending from the circuit breaker source terminals to the energizing bus bars of the distribution panel.

In addition to this, the interconnecting straps are such that the front surfaces of the circuit breakers will lie in a single plane regardless of the depth of the circuit breaker and receive a cover member which can be easily and economically adapted for any combination of circuit breakers of different physical sizes.

Accordingly, a primary object of this invention is to provide a novel distribution panel which utilizes a minimum of different parts and occupies a small volume.

Another object of this invention is to provide a novel distribution panel wherein a single chassis can receive different sized circuit breakers.

Another object of this invention is to provide a novel distribution panel wherein different sized circuit breakers are received by a single chassis, and the top surfaces of the circuit breakers lie in a common plane, and are partially secured by a novel interchangeable cover which can receive any configuration or relative positioning of different size circuit breakers.

In the past, when a plurality of circuit breakers are mounted side by side in a distribution panel, it has been the practice to provide separately mounted strips of insulation between at least the adjacent line terminals of the adjacent circuit breakers. Since the circuit breakers are normally spaced from one another by embossments extending from the sides of the circuit breakers, I have found that the adjacent embossments of adjacent circuit breakers can serve as a support and positioning means for supporting and positioning adjacent insulating strips.

It has been the further practice to provide a separately mounted insulating strip between the end of the bus bars entering the distribution panel and the neutral bar assembly which serves to receive neutral or ground conductors. In accordance with the present invention, however, a flat insulating strip between the bottom of the distribution panel and the bus bars is bent upwardly at the end thereof adjacent the neutral bar assembly whereby the insulation between the bus bars and the neutral bar assembly is achieved by this unitary insulating means.

Accordingly, a further object of this invention is to provide novel means for insulating between the neutral bar assembly of the distribution panel and the bus bars of the panel.

Another object of this invention is to provide novel supporting and positioning means for the insulating strips which insulate between adjacent circuit breaker terminals.

Yet a further object of this invention is to utilize the spacing embossments of adjacent circuit breakers as a positioning and retaining means for insulating strips which provide an insulating barrier between adjacent circuit breaker terminals.

These and other objects of my invention will become apparent from the following description when taken in conection with the drawings, in which.

Figure 1:
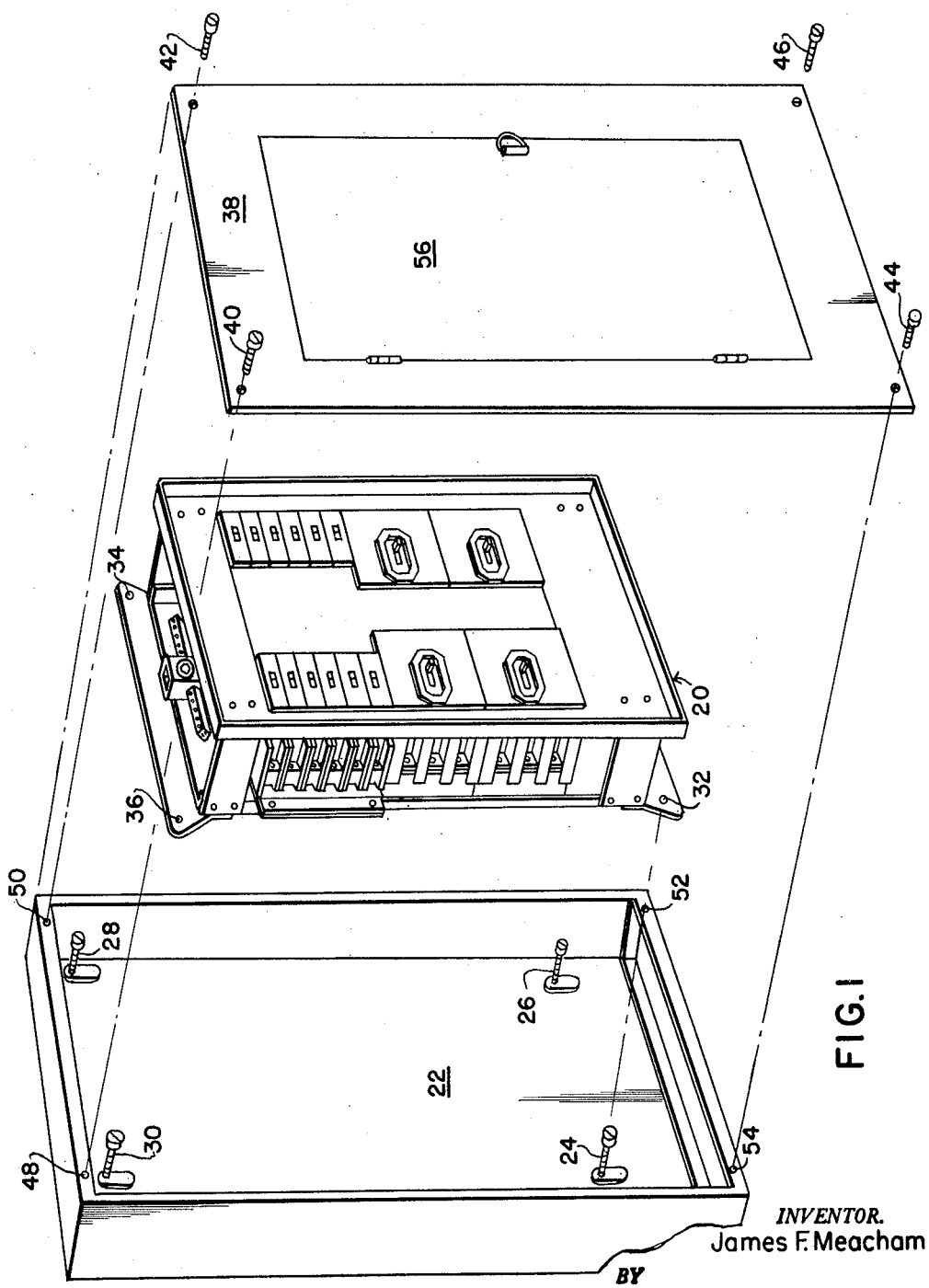
FIGURE 1 shows an exploded perspective view of the distribution panel and the container therefor.

Referring now to FIGURE 1, my novel distribution panel is shown in perspective view as panel 20, and is removably connected within a distribution box 22 of standard construction, as by the four corner studs 24, 26, 28 and 30 which are welded to distribution box 22 and which cooperate with apertures 32, 33 (FIGURES 2 and 3), 34 and 36 respectively in the base of the distribution panel 20, as will be described more fully hereinafter. Four hex nuts are then installed on studs 24, 26, 28 and 30 which hold panel 20 securely to distribution box 22.

The box cover 38 is then connected to box 22 as by bolts 40, 42, 44 and 46 which cooperate with openings 48, 50, 52 and 54 respectively in box 22. Box cover 38 then has a hinged door 56 which can be opened to provide access to distribution panel 20 in the usual manner.

Figure 2:
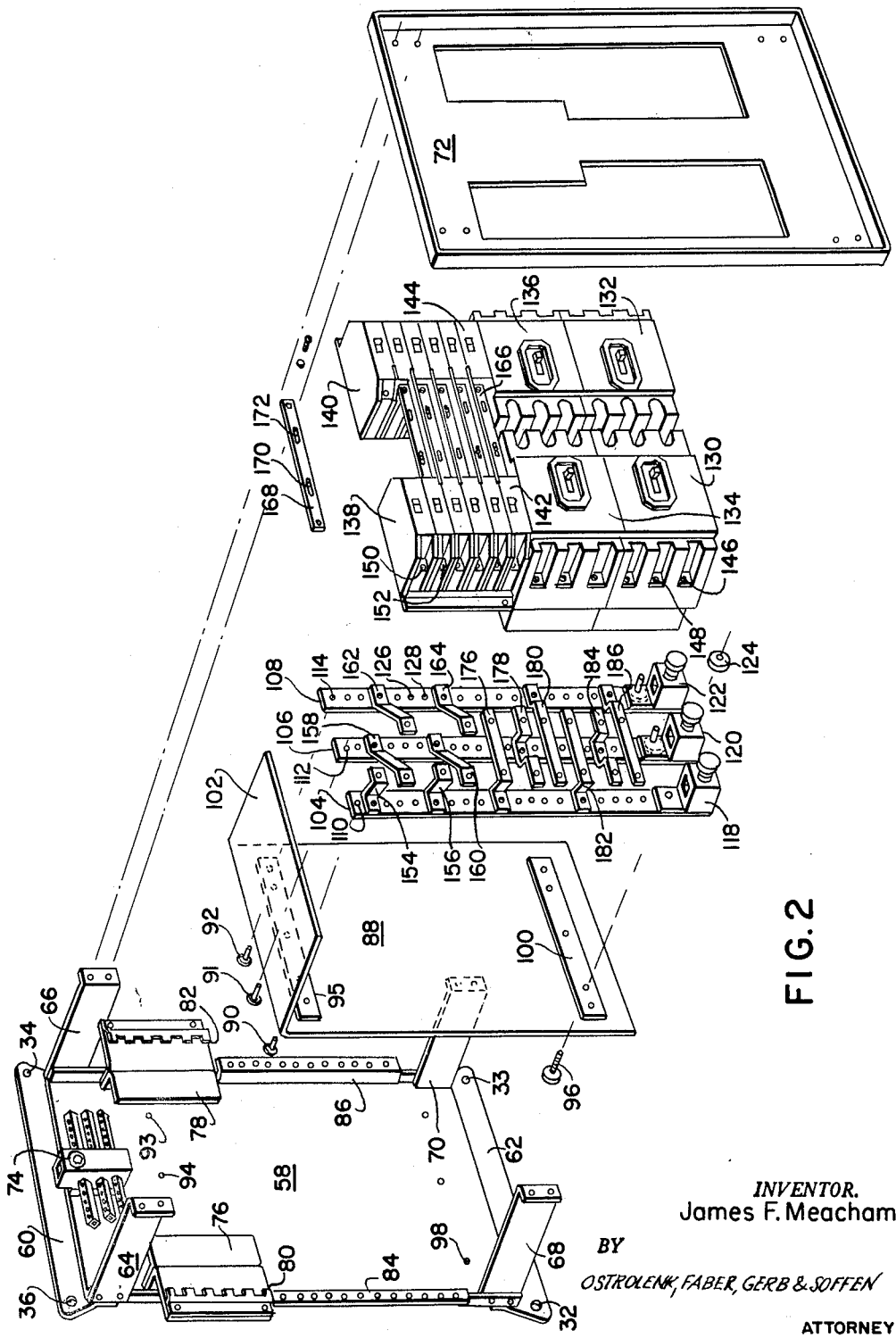
FIGURE 2 shows an exploded perspective view of the distribution panel of the present invention.
Figure 3:
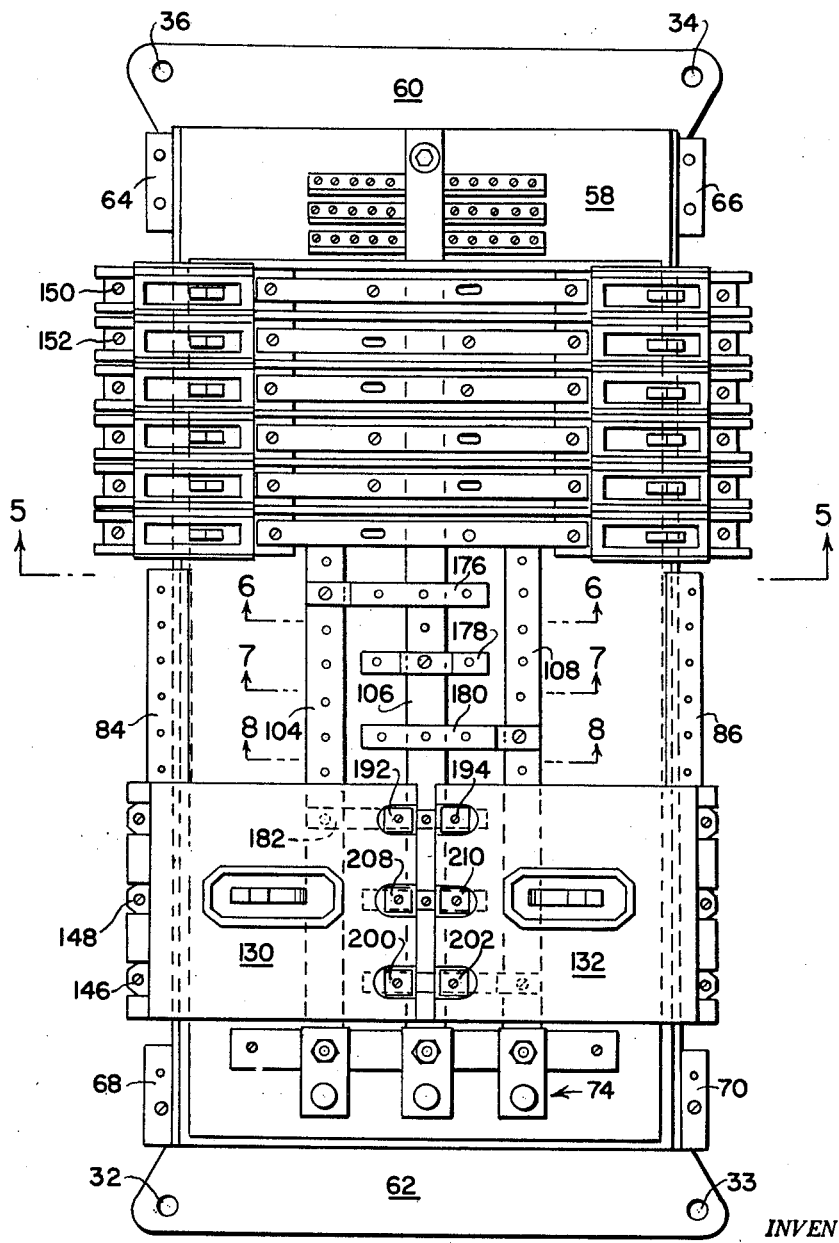
FIGURE 3 shows a front view of the distribution panel of FIGURE 2 with the top plate removed.
Figure 4:
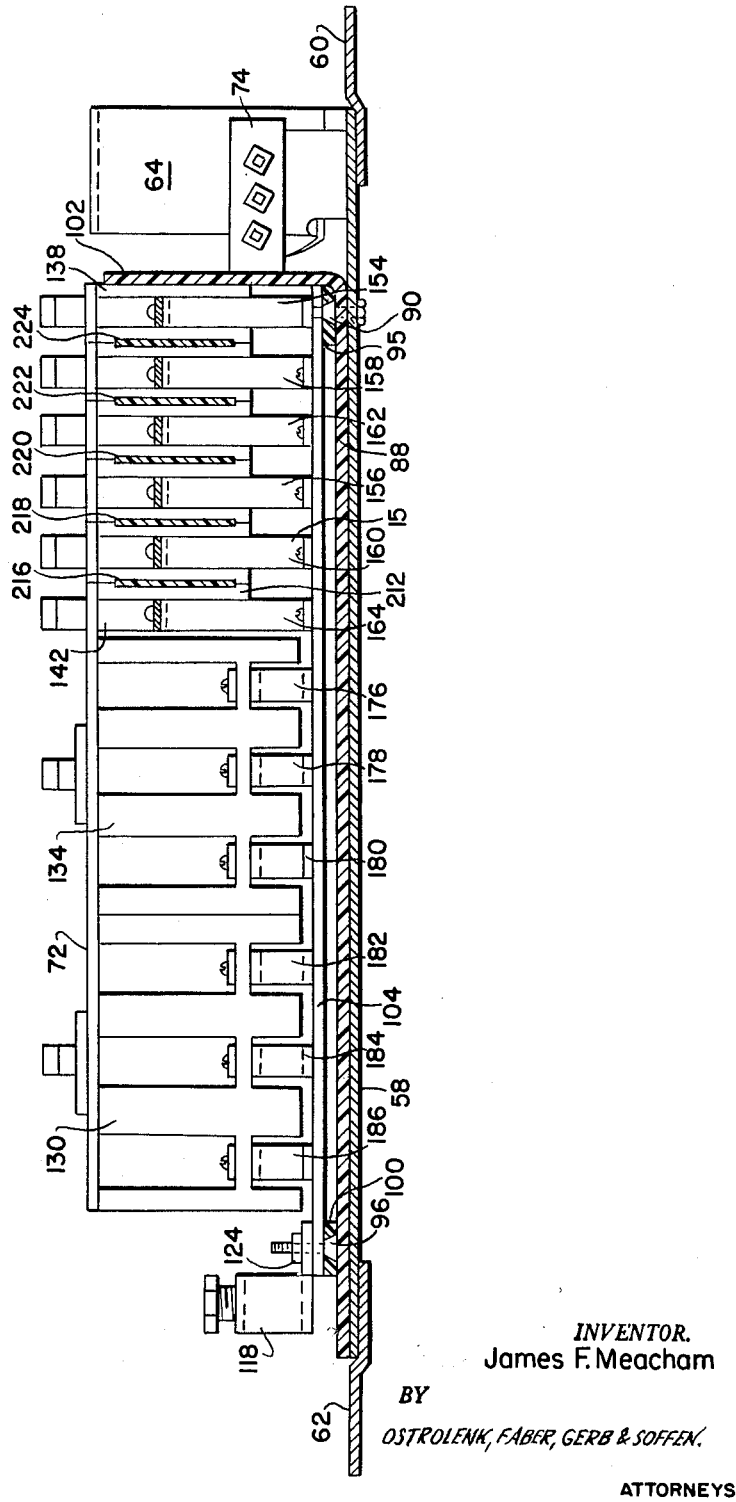
FIGURE 4 shows a side view of FIGURE 3 as seen from the right of FIGURE 3 with the side mounting plates removed.

The distribution panel 20 of FIGURE 1 is best shown in FIGURES 2, 3 and 4 where it is illustrated for the case of a three-phase four-wire panel board.

Referring now to FIGURES 2, 3 and 4, the distribution panel includes a base member 58 which may be of sheet metal and has protruding ears 60 and 62 connected thereto for providing apertures 32, 33, 34 and 36, previously described for securing the distribution panel to box 22.

The base is further provided with four projecting legs 64, 66, 68 and 70 which are rigidly connected thereto in any desired manner as by riveting or welding, or with screws, and serve to receive the cover plate member 72 through any appropriate removable fastening means, such as screws or bolts, which extend from the corners of cover 72 to the respective extending members 64 through 70.

A neutral bar assembly 74 is then mounted on plate 58 and serves to receive ground conductors of various circuits extending from the various circuit breakers to be described hereinafter whereby the fourth wire of the three-phase four-wire circuits are connected to the neutral bar elements.

In order to receive single phase circuit breakers on either side of base plate 58, a first support means 76 and a second support means 78 (see FIGURES 2 and 5) are placed on either side of the plate 58, as by removably mounting them by screws 75 and 77 respectively. Each of mounting members 76 and 78 are formed of sheet metal, and provide a plurality of extending fingers such as fingers 80 and 82 respectively which are operable to pivotally receive an outer portion of the smaller rotatable-type circuit breakers in the manner best shown in FIGURE 5, and as will be discussed more fully hereinafter with reference to FIGURE 5.

In order to mount larger circuit breakers, base 58 is provided with a third and fourth mounting means 84 and 86 of FIGURES 2 and 3 which are angle members having a plurality of threaded openings tapped therein at spacings which correspond to the spacings of the connecting bolts of the larger circuit breakers, as will be described more fully hereinafter.

An insulating sheet 88 is then secured to the upper surface of bottom plate 58, as by passing insulated screws through openings in insulating strips 95 and 100 and through corresponding holes in insulating sheet 88 and, thus, into corresponding threaded holes in bottom plate 58 such as holes 93, 94, 98 and one other hole not numbered. The upper portion 102 of insulating plate 88 is bent upwardly in the manner shown immediately before the plate reaches the neutral bar assembly 74 in the manner best shown in FIGURE 4.

The purpose of insulating plate 88 and strips 95 and 100 is to insulate bus bars 104, 106 and 108 from the metallic plate 58. Bus bars 104, 106 and 108 are secured in position with respect to bottom plate 58 in any desired manner, as by bolting with an insulating bolt means where the bolts such as bolts 90, 91 and 92 extend through insulating strips 95 and 100 and extend further to receive buses 104, 106 and 108 respectively. The upper portions of buses 104, 106 and 108 may have enlarged threaded openings 110, 112 and 114 respectively to receive the shanks of these connecting screws. Such a securing means is shown in FIGURE 4 for the case of bus 104 where bolt 90 is fastened to bus 104 to thereby secure the bus bar in position to insulating strip 95.

The lower end of each of buses 104, 106 and 108 receive terminals 118, 120 and 122, and here, again, the same fastening means such as bolt 96 may be used to secure bus 104 and terminal 118 at the same time wherein a nut 124 thereafter engages bolt 96. In the same manner, a second and third bolt similar to bolt 96 is used to secure buses 106 and 108 and terminals 120 and 122 in their desired position.

Each of buses 104, 106 and 108 have tapped openings, such as openings 126 and 128 of bus 108 (FIGURE 2) at predetermined spaced distances along their complete length. These openings receive conductive strap members which serve to electrically connect various circuit breakers mounted on the panel board to appropriate bus conductors and, in part, to support these various circuit breakers. In addition, the strap configuration is such that a single chassis may serve for a plurality of different type circuit breakers.

In the embodiment of FIGURES 2, 3 and 4, three-phase circuit breakers 130, 132, 134 and 136 as well as single phase circuit breakers, such as circuit breakers 138, 140, 142 and 144 at each end of the stack are carried by the same chassis.

In FIGURE 3, the front view of FIGURE 2 is shown with circuit breakers 134 and 136 removed to expose the internal bus work.

In the embodiment shown, the three-phase circuit breakers 130 through 136 may have their terminals, such as terminals 146 and 148 of circuit breaker 130, on 1½ inch centers, while the terminals of the single phase circuit breakers may have their adjacent terminals, such as terminal 150 of circuit breaker 138 and terminals 152 of the adjacent circuit breaker on one inch centers. In addition, the physical height of the circuit breakers differs, as best illustrated in FIGURE 4.

In order to mount these various types of circuit breakers, the tapped openings in the bus bars, such as openings 126 and 128 may be placed on ¾ inch centers. The strap members extending from the bus bars to the circuit breakers for the case of the single phase circuit breakers include members 154 and 156 (FIGURES 2 and 4) which are bolted to bus bar 104 by appropriate bolt means which pass through openings in the connectors and into the tapped openings of the bus bar, and similar members 158 and 160 are for the central bus bar 106, and similar members 162 and 164 for the bus bar 108.

Figure 5:
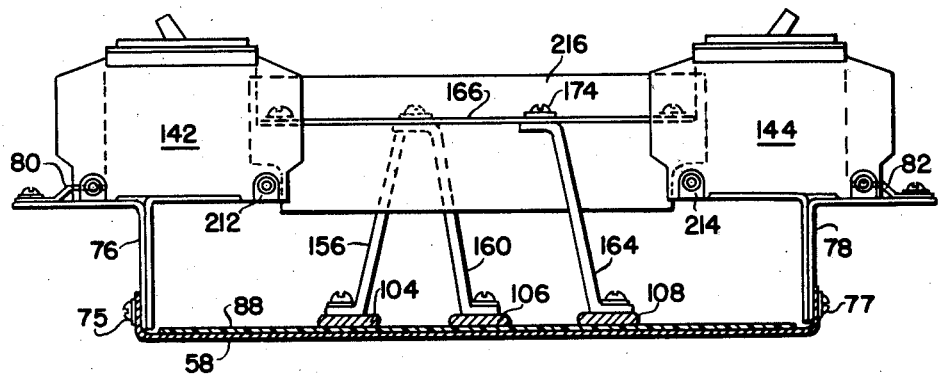
FIGURE 5 shows a cross-sectional view of FIGURE 3 taken across the lines 5—5 in FIGURE 3.

It is to be noted that all of members 154 through 164 are identical in construction, as best seen in FIGURE 5 for the case of members 156, 160 and 164.

The upper ends of the various members are then aligned with openings in conductive jumpers, such as conductive jumper 166 (FIGURE 2) of circuit breakers 142 and 144 where these various jumpers are electrically connected to the line terminal of those single phase circuit breakers which lie in the same plane. Such a jumper is shown in exploded view for the case of circuit breakers 138 and 140 as conductive jumper 168. It will be noted that conductive jumper 168, as well as all of the other conductive jumpers, have two openings, such as openings 170 and 172, so that it can receive the upper end of the various connector members, such as members 154 or 164, whether the top of the member lies in the line of the top of members 154, 158, 156 and 160, or whether it lies in the line of members 162 and 164.

For the case of jumper 166, FIGURE 5 clearly shows that the member 164 is electrically connected thereto as by a screw 174 which enters the tapped opening in the upper section of the member 164. This will, therefore, electrically connect bus bar 108 to the line terminals of circuit breakers 142 and 144.

The next layer of single phase circuit breakers adjacent circuit breakers 142 and 144 will have their common jumper electrically connected to member 160 which is immediately adjacent member 164. Therefore, these two circuit breakers will have their line terminals electrically connected to bus 160. The next two circuit breakers will be electrically connected to bus 104 by the member 156, and the next layer of circuit breakers will be connected to bus 108 by means of members 162, and so on.

It is to be noted that because of this staggered connection, the load on the various phase conductors 104, 106 and 108 which are connected to a multiphase source by terminals 118, 120 and 122 is relatively balanced.

Since the load terminals of the single phase circuit breakers are on one inch centers, if the openings in the bus bars which receive the connectors are on ¾ inch centers, the connectors will have to be slightly rotated to accommodate the additional ¼ inch. Here, however, a single bending identical operation on all of the conductors will achieve the desired result of positioning the top of the conductors in the appropriate position to receive the common conductor spanning two circuit breakers in the same plane.

Figure 6:
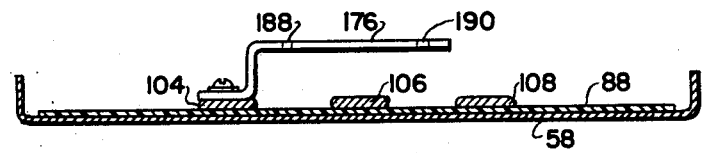
FIGURE 6 is a partial cross-sectional view of FIGURE 3 across the lines 6—6, and particularly illustrates the extending conductor for the left-hand bus.

Next to be considered is the manner in which the individual three-phase circuit breakers 130 through 136 may be electrically connected to bus bars 104, 106 and 108. For this, extending conductive members, such as members 176, 178, 180, 182, 184 and 186 are utilized where members 176, 180, 182 and 186 are of identical construction. Member 176 is shown in FIGURE 6, and has a first and second tapped opening 188 and 190 respectively therein for receiving the line terminals of the upper phases of circuit breakers 134 and 136. This is seen in FIGURE 3 for the case of connector 182 which is connected to terminals 192 and 194 of circuit breakers 130 and 132. Thus, these upper terminals of circuit breakers 130 through 136 are connected to the phase which energizes bus 104.

Figure 8:
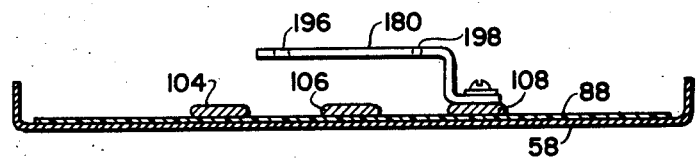
FIGURE 8 is a partial cross-sectional view of FIGURE 3 across lines 8—8, and illustrates the extending conductor for the right-hand bus of FIGURE 3.

In a similar manner, member 180 of FIGURE 8 is provided with tapped openings 196 and 198 which receive the lower circuit breaker terminals, such as circuit breaker terminals 200 and 202 of circuit breakers 130 and 132 of FIGURE 3 whereby the lower terminals of all of the circuit breakers 130 through 136 are connected to the phase which energizes bus bar 108.

Figure 7:
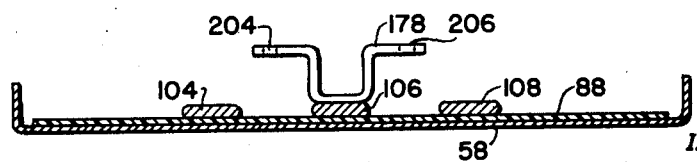
FIGURE 7 is a partial cross-sectional view of FIGURE 3 across lines 7—7 of FIGURE 3, and particularly illustrates the extending conductor for the central bus of FIGURE 3.

The central members 178 and 184 have the configuration shown in FIGURE 7 for the case of member 178 which has tapped openings 204 and 206 therein which receive the central line terminals of the circuit breakers as shown in FIGURE 3 for terminals 208 and 210 which receive member 184. Thus, the central line terminals of all of the circuit breakers are electrically connected to the phase which energizes bus 106.

In order to mount the various circuit breakers described heretofore, it is clear that the appropriate connecting members will first be placed upon bus bars 104, 106 and 108 in accordance with the type of circuit breakers which are to be positioned at that point. Thus, for the case of the small single phase circuit breakers, an appropriate number of members, such as members 154 through 164, are fastened to the bus bars 104, 106 and 108, and support members 76 and 78 having an appropriate length are connected to base 58.

In order to secure the single phase circuit breakers in position and as best seen in FIGURE 5, the circuit breakers are first hinged to teeth such as teeth 80 and 82 for circuit breakers 142 and 144, and then rotated into position. The common jumper 166 is then secured to the line terminals of circuit breakers 142 and 144, as shown in FIGURE 5, and is then secured to member 164 which has been previously positioned on bus 108 by a screw. In a like manner, as many layers of single phase breakers as are required are installed.

To secure the larger three-phase breakers to the panel, an appropriate number of groups of conductors, 176, 178 and 180 are first secured to the buses on proper centers. Thereafter, the circuit breaker mounting means (not shown) which could be a bolt extending through the circuit breaker is secured to the appropriate angle member 84 or 86 and the circuit breaker line terminals are then directly connected to the conducting straps, such as straps or members 176, 178 or 180.

As previously mentioned, the individual single phase circuit breakers are normally spaced with respect to one another as by embossments on the circuit breaker housings. Such embossments are shown for the case of circuit breakers 142 and 144 as embossments 212 and 214 where embossment 212 is shown in both FIGURES 4 and 5.

These embossments which space adjacent circuit breakers may also serve to carry an insulating strip, such as insulating strip 216 which is positioned between circuit breakers 142 and 144 and the next row of adjacent units as best seen in FIGURES 4 and 5, whereby the line terminals of the adjacent circuit breaker units have an appropriate barrier interposed therebetween. In a like manner, insulating strips 218, 220, 222 and 224 are positioned between the other adjacent units where the circuit breaker embossments serve to both position the insulating strips and secure them with respect to the circuit breakers.

Once the circuit breakers are in their required position, the front cover plate 72 thereafter is placed in position, and encloses all but the various circuit breaker escutcheons in the manner shown in FIGURE 1. It is to be noted that where a different configuration of circuit breaker units is used, a different shape cover is all that is required to make the modification. This may be further simplified by merely providing a different bridging or central portion for cover 72 which can be connected in place with respect to the body of the cover. Thus, again, a minimum of distinct elements are required for storage or inventory, while a maximum amount of flexibility of panel board construction is achieved.

Although I have described preferred embodiments of my novel invention, many variations and modifications will now be obvious to those skilled in the art, and I prefer therefore to be limited not by the specific disclosure herein but only by the appended claims.

I claim:

1. A distribution panel comprising a back cover, a first and second bus bar, a first circuit breaker and a second circuit breaker; said first and second bus bar being carried on the front of said back cover in coplanar relation with respect to one another and in insulated relation with respect to one another; said first and second circuit breakers being positioned in aligned coplanar relation with their line terminals adjacent one another; means connecting said first and second circuit breaker line terminals to said first bus bar; a third and fourth circuit breaker positioned in aligned coplanar relation with their line terminals adjacent one another; said first and second aligned circuit breakers being positioned adjacent to said third and fourth aligned circuit breakers; means connecting said third and fourth circuit breaker line terminals to said second bus bar; said first and third circuit breakers being immediately adjacent one another and spaced from one another by embossment means extending from their opposing sides; said second and fourth circuit breakers being positioned immediately adjacent one another and having second embossment means extending from their said adjacent sides to space said second and fourth circuit breakers; an insulating strip positioned between at least the line terminals of said first and third circuit breakers and the line terminals of said second and fourth circuit breakers; said embossment means and said second embossment means of said first and third circuit breakers and said second and fourth circuit breakers respectively forming slots for receiving cooperating extensions of said insulating strip, whereby said insulating strip is positioned and held by said embossment means and said second embossment means.

2. A distribution panel comprising a back cover, a first and second bus bar, a first circuit breaker and a second circuit breaker; said first and second bus bar being carried on the front of said back cover in coplanar relation with respect to one another and in insulated relation with respect to one another; said first and second circuit breaker having different dimensions from their line terminals to said first and second bus bars; a first connecting member for connecting said first bus bar to the line terminal of said first circuit breaker; a second connecting member for connecting said second bus bar to the line terminal of said second circuit breaker; said first and second connecting members being relatively rigid; said first and second connecting members mechanically supporting at least one end of said first and second circuit breakers; said first and second circuit breakers being mounted adjacent one another; said first and second bus bars having an insulating sheet positioned between said bus bars and said front of said back cover to place said first and second bus bars in said insulated relation with respect to one another; said back cover having a neutral bar assembly secured thereto adjacent the end of said first and second bus bars; said insulating sheet being turned upwardly and away from said front of said back cover at said end of said first and second bus bars whereby said up-turned portion of said insulating sheet is positioned between said ends of said first and second bus bars and said neutral bar assembly.

3. The combination of a panelboard and a plurality of circuit breakers mounted thereto; said panelboard comprising a plurality of spaced parallel bus bars, securing means on said bus bars defining a plurality of equally spaced locations a first distance apart along the longitudinal axis of each of said bus bars; a multiphase circuit breaker having a terminal for each of its phases, said terminals being aligned parallel to said first distance and spaced apart by a second distance, which is said first distance multiplied by an integer; conducting means connecting each of said terminals to said securing means of a different one of said bus bars; a first and a second single phase circuit breaker mounted side to side each having a line terminal at one end thereof; said line terminals being spaced apart by a third distance which is greater than said first distance and less than two times said first distance; additional conducting means connecting each of said line terminals to said securing means of a different one of said bus bars.

4. The combination of claim 3 also comprising a third and a fourth single phase circuit breaker mounted side by side each having a line terminal at one end thereof; said line terminals of said third and said fourth circuit breakers spaced apart by said third distance and being connected to said bus bars by said additional conducting means; said additional conducting means comprising a first and a second elongated jumper each transverse to said bus bars; said first jumper extending between the line terminals of said first and said third circuit breakers while said second jumper extends between said second and said fourth circuit breakers; each of said jumpers having an elongated aperture whose long axis is parallel to the longitudinal axis of the respective jumper.

5. The combination of claim 4 in which the additional conducting means also comprises straps of identical construction extending from each of said jumpers to a different one of said bus bars.

6. The combination of claim 5, wherein each of said straps includes a first end connected to one of said locations of its respective bus bar, and a second end connected to its respective jumper; said strap including a longitudinal offset to compensate for the dimensional difference between said third distance and an integral number of said first distance.

References Cited by the Examiner

UNITED STATES PATENTS

| | | | |
|---|---|---|---|
| 2,351,942 | 6/44 | Dyer | 317—119 |
| 2,735,043 | 2/56 | Speck | 317—119 |
| 2,880,263 | 3/59 | Herrmann et al. | 317—119 |
| 2,942,157 | 6/60 | Davis | 317—119 |
| 2,977,449 | 3/61 | Roethlisberger | 317—99 |

JOHN F. BURNS, *Primary Examiner.*

SAMUEL BERNSTEIN, *Examiner.*